US012745143B2

(12) United States Patent
Wiszniewski et al.

(10) Patent No.: US 12,745,143 B2
(45) Date of Patent: Sep. 22, 2026

(54) DETERMINING WHETHER TO PERFORM A HANDOVER

(71) Applicant: Telefonaktiebolaget LM Ericsson (publ), Stockholm (SE)

(72) Inventors: Miruna-Teodora Wiszniewski, Kaarst (DE); Varun Prabhu Joshi, Düsseldorf (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 285 days.

(21) Appl. No.: 18/574,824

(22) PCT Filed: Jun. 28, 2021

(86) PCT No.: PCT/SE2021/050639

§ 371 (c)(1),
(2) Date: Dec. 28, 2023

(87) PCT Pub. No.: WO2023/277738

PCT Pub. Date: Jan. 5, 2023

(65) Prior Publication Data

US 2024/0373301 A1 Nov. 7, 2024

(51) Int. Cl.
*H04W 36/00* (2009.01)

(52) U.S. Cl.
CPC . *H04W 36/00838* (2023.05); *H04W 36/0058* (2018.08); *H04W 36/0069* (2018.08); *H04W 36/0072* (2013.01)

(58) Field of Classification Search
CPC ......... H04W 36/0058; H04W 36/0069; H04W 36/0072; H04W 36/00838; H04W 40/12;
(Continued)

(56) References Cited

U.S. PATENT DOCUMENTS

2014/0162669 A1* 6/2014 Dahlen ............. H04W 72/0453 455/450
2018/0027471 A1* 1/2018 Zhang ................... H04W 36/08 455/436

(Continued)

FOREIGN PATENT DOCUMENTS

CN 112399516 A 2/2021
WO 2015172061 A1 11/2015

(Continued)

OTHER PUBLICATIONS

3GPP; LTE; Evolved Universal Terrestrial Radio Access (E-UTRA); Radio Resource Control (RRC); Protocol specification (3GPP TS 36.331 version 15.7.0 Release 15); ETSI TS 136 331 V15.7.0 (Oct. 2019); 967 pages.

(Continued)

*Primary Examiner* — Nguyen T Vo
(74) *Attorney, Agent, or Firm* — Sage Patent Group

(57) ABSTRACT

A method performed by a radio access network (RAN) node includes receiving, from a user equipment, a first measurement report relating to a first frequency layer, determining whether a priority level of the first frequency layer is lower than a priority level of another frequency layer to be measured by the user equipment, if the priority level of the first frequency layer is lower than a priority level of another frequency layer to be measured by the user equipment, waiting, for up to a predetermined time period, to receive a second measurement report relating to a frequency layer of a higher priority level than the first frequency layer, and determining whether to perform a handover of the user equipment based on the one or more received measurement reports.

20 Claims, 10 Drawing Sheets

(58) Field of Classification Search
CPC . H04W 40/36; C12N 15/113; C12N 2310/11; C12N 2310/14; C12N 2310/20; C12N 2310/531; C12N 2320/12; G16B 20/30; G16B 20/50; G16B 25/10
See application file for complete search history.

(56) References Cited

U.S. PATENT DOCUMENTS

| | | | | |
|---|---|---|---|---|
| 2021/0044993 A1* | 2/2021 | Jha | ................ | H04W 36/008355 |
| 2021/0092660 A1* | 3/2021 | Cui | ........................ | H04W 24/10 |
| 2021/0352542 A1* | 11/2021 | Chang | .................... | H04W 48/18 |
| 2022/0150904 A1* | 5/2022 | Santhanam | ....... | H04W 36/0085 |

FOREIGN PATENT DOCUMENTS

| | | |
|---|---|---|
| WO | 2021006659 A1 | 1/2021 |
| WO | 2021044375 A1 | 3/2021 |

OTHER PUBLICATIONS

3GPP; 5G; NR; Radio Resource Control (RRC); Protocol specification (3GPP TS 38.331 version 15.11.0 Release 15); ETSI TS 138 331 V15.11.0 (Nov. 2020); 532 pages.

International Search Report and Written Opinion of the International Searching Authority mailed Mar. 1, 2022 for International Application No. PCT/SE2021/050639, 11 pages.

* cited by examiner

301

302

DETERMINING WHETHER TO PERFORM A HANDOVER

CROSS-REFERENCE TO RELATED APPLICATIONS

This application is a 35 U.S.C § 371 national stage application for International Application No. PCT/SE2021/050639, entitled "DETERMINING WHETHER TO PERFORM A HANDOVER", filed on Jun. 28, 2021, assigned to the assignee hereof, and expressly incorporated herein by reference.

TECHNICAL FIELD

This disclosure relates to a method and radio access network node for determining whether to perform a handover.

BACKGROUND 5G non-standalone (5G NSA) technology implements 5G using some of the existing 4G infrastructure. Long-Term Evolution (LTE) layer(s) are configured as anchors to provide control plane communication and mobility management. E-UTRAN (Evolved-UMTS Terrestrial Radio Access Network) New Radio Dual Connectivity (ENDC) allows a wireless device (WD) (e.g. user equipment (UE)) to connect to both an LTE network node, which serves as a master node and controls the master cell group (MCG), and to a 5G NR network node, which serves as a secondary node and controls the secondary cell group (SCG). WDs thereby anchor on a LTE frequency layer for control signalling, whilst also communicating on New Radio (NR) frequency layers to benefit from 5G technology. The term "frequency layer" is used herein to refer, for example, to part of a frequency band or a frequency sub-band. A frequency layer can generally be understood to be a particular spectrum asset deployed and used in an operator's network. A cell in the network may operate in a particular frequency layer. The terms WD and UE are herein used interchangeably.

In multi-layer LTE networks, if ENDC is not deployed on all LTE frequency layers, or if UEs do not support ENDC on all the deployed combinations of LTE frequency layers and NR frequency layers, then UEs may be served by LTE frequency layers which cannot provide them with ENDC service. Consequently, these UEs are unable to set up SCG radio resources on NR frequency layers. To give the UEs access to ENDC, the UEs must be steered to an appropriate frequency layer that can act as a LTE anchor. This steering is done selectively, so that UEs that are not capable of ENDC are not impacted. The UE remains connected during the handover so that there is no loss of service.

The mechanism of steering an ENDC-capable UE to an anchor in connected mode is called an ENDC-triggered handover (ENDCHO). An ENDCHO is an example of a LTE inter-frequency handover and is used to move an ENDC-capable UE to a neighbouring ENDC-capable frequency layer or cell.

Two ENDC-triggered handover scenarios are depicted in FIG. 1. LTE frequency layer A does not support ENDC. Therefore, an ENDC-capable WD, WD 1, that is connected to LTE frequency layer A should perform a handover to LTE frequency layer B in order to use ENDC. LTE frequency layer B is ENDC-capable for NR frequency layer X, and therefore WD1 can set up SCG resources on NR frequency layer X. However, LTE frequency layer B is not ENDC-capable for NR frequency layer Y. Therefore, WD 2, which is ENDC-capable but does not support ENDC on NR frequency layer X, should perform a handover from LTE frequency layer B to LTE frequency layer C in order to use ENDC on NR frequency layer Y. LTE frequency layer C is ENDC-capable for NR frequency layer Y and can therefore serve as an LTE anchor for WD 2 and WD 2 can set up SCG resources on NR frequency layer Y.

As part of the ENDCHO framework, the UE is configured to send measurement reports (MR) to the serving radio access network (RAN) node. For example, the RAN node can request the UE to send so-called "A5 measurements" and "NR B1 measurements" for specific frequency layers. To determine which frequency layers to request the UE to measure on, the RAN node determines a prioritised list with the higher priority layers being the ones that the RAN node would prefer the UE to use for ENDC. The frequency layers selected for the list and the order in which the frequency layers appear in the list can be determined according to various factors, such as the capabilities of the UE (e.g. whether the UE is ENDC-capable and whether the UE can operate in the frequency layer); and the capabilities of the frequency layer (e.g. whether the frequency layer can support ENDC). Priority can be assigned to each frequency layer by the network operator. For example, priority can be indicated using a configurable parameter such as EndcHoFreqPriority. The RAN node will request the UE to measure on one or more of the highest priority frequency layers in the list. The UE will measure on the requested frequency layers and send MRs to the RAN node, e.g. A5 measurement reports.

Upon receiving a MR relating to an ENDC-capable LTE layer, the RAN node will order a LTE inter-frequency handover to the LTE layer, which then serves as an anchor for the UE.

SUMMARY

Under the current ENDCHO mechanism, the ENDC-capable LTE frequency layer selected for the handover will be the layer corresponding to the first measurement report received by the RAN node. Although the RAN node prioritises a list of frequency layers for measurement by the UE, the decision of which LTE frequency layer to measure first resides with the UE. It has been found that UEs typically start measurements with the lower-band LTE frequency layers, that usually have a lower available bandwidth, which means the measurement reports for these layers may be delivered first. This situation might generate a sub-optimal anchoring selection as the achievable performance is driven by the total bandwidth of the NR carrier and the LTE anchor. Thus, the existing mechanism does not always lead to the most appropriate frequency layer being selected for the purpose of serving as an LTE anchor. That is to say, the frequency layer that is used for the handover may not provide the best end-user performance, and an alternative frequency layer is often available that, if used for the handover, could provide better end-user performance. This stems from the fact that, under the current ENDCHO mechanism, a handover is performed to the LTE frequency layer for which the first matching MR is delivered by the UE, regardless of whether this LTE layer will provide the best LTE and NR anchoring pair, and there is no control over which LTE layers the UE measures first. As such, there is no mechanism for prioritising among different MRs received by the RAN node to select a frequency layer that can provide better end-user performance.

FIG. 2 is an example from a network in which the current ENDCHO mechanism was implemented from day 12 onwards. From day 12 onwards, there were four frequency layers available for use as an anchor layer: L700, L800, L1800 and L2600. These frequency layers have corresponding bandwidths of 5, 10, 20 and 20 MHz respectively. In this example, the network operator assigns (or has assigned) a priority level to each frequency layer, and typically assigns higher priority to the higher frequency layers because the higher frequency layers provide greater bandwidth. As such, the higher frequency layers are preferred for use as the anchor layer. However, the data in FIG. 2 shows that the layer most frequently used as an ENDC anchor was the lowest frequency LTE layer, L700, which correspondingly has the lowest priority. As a result, the LTE+NR anchoring pairings were, on average, less effective than if the higher frequency LTE layers had been more frequently used as anchors.

FIG. 3 depicts two ENDC-triggered handover scenarios, 301 and 302. In scenario 301, a WD is initially performing a Radio Resource Control (RRC) setup on frequency layer L1500 (or has been handed over to this frequency layer), but L1500 cannot serve as an LTE anchor for ENDC. The WD can, on the other hand, support ENDC with either frequency layer L1800 or L900 serving as a LTE anchor. These LTE frequency layers can both be paired with NR frequency layer, NR2.1. Frequency layers L1800 and L900 are therefore possible candidates for an ENDCHO. The ENDCHO framework will instruct the WD to perform A5 and B1 measurements. The WD sends a MR to a RAN node for LTE frequency layer L900, and therefore the RAN node initiates a handover of the WD to L900. After the handover, the achievable performance is driven by the total bandwidth of the NR layer that is serving as a carrier plus the LTE layer that is serving as an anchor. In scenario 301, this uplink bandwidth is 25 MHz (=5+20 MHZ). In contrast, had the RAN node initiated a handover of the WD to frequency layer L1800, as shown in scenario 302, the uplink bandwidth would have been 40 MHz (=20+20 MHz).

Thus, under the existing ENDCHO mechanism, the LTE layer selected for handover is often a lower frequency layer, despite the lower frequency layer being assigned a lower priority by the RAN node than other frequency layers that may be available and suitable for handover. The layer selected for handover is therefore often not the layer that can provide the highest aggregated bandwidth out of the available layers. This has a negative impact on the overall LTE+NR performance and can result in ENDC-capable UEs being effectively penalised in performance once using 5G NSA.

Certain aspects of the present disclosure and their embodiments may provide solutions to the above or other challenges. Techniques are proposed for improving the procedure used to determine whether to perform a handover for a wireless device. The disclosed techniques facilitate the selection of a higher-priority frequency layer for handover by the RAN node waiting for up to a predetermined time period to receive a measurement report relating to a frequency layer of a higher priority level. The result is an improved mechanism for selecting a frequency layer for handover that can provide better end-user performance than current implementations.

According to a first aspect, there is provided a method performed by a radio access network, RAN, node. The method comprises: receiving, from a user equipment, a first measurement report relating to a first frequency layer; and determining whether a priority level of the first frequency layer is lower than a priority level of another frequency layer to be measured by the user equipment. The method further comprises, if the priority level of the first frequency layer is lower than a priority level of another frequency layer to be measured by the user equipment, waiting, for up to a predetermined time period, to receive a second measurement report relating to a frequency layer of a higher priority level than the first frequency layer; and determining whether to perform a handover of the user equipment based on the one or more received measurement reports.

According to a second aspect, there is provided a radio access network, RAN, node. The RAN node is configured to: receive, from a user equipment, a first measurement report relating to a first frequency layer; determine whether a priority level of the first frequency layer is lower than a priority level of another frequency layer to be measured by the user equipment; if the priority level of the first frequency layer is lower than a priority level of another frequency layer to be measured by the user equipment, wait, for up to a predetermined time period, to receive a second measurement report relating to a frequency layer of a higher priority level than the first frequency layer; and determine whether to perform a handover of the user equipment based on the one or more received measurement reports.

According to a third aspect, there is provided a radio access network, RAN, node. The RAN node comprises a processor and a memory, the memory containing instructions executable by the processor whereby the RAN node is operative to: receive, from a user equipment, a first measurement report relating to a first frequency layer; determine whether a priority level of the first frequency layer is lower than a priority level of another frequency layer to be measured by the user equipment; if the priority level of the first frequency layer is lower than a priority level of another frequency layer to be measured by the user equipment, wait, for up to a predetermined time period, to receive a second measurement report relating to a frequency layer of a higher priority level than the first frequency layer; and determine whether to perform a handover of the user equipment based on the one or more received measurement reports.

According to a fourth aspect, there is provided a computer program product comprising a computer readable medium having computer readable code embodied therein, the computer readable code being configured such that, on execution by a suitable computer or processor, the computer or processor is caused to perform the method according to the first aspect or any embodiment thereof.

The techniques disclosed herein provide a mechanism to select a better (i.e. higher priority) frequency layer for handover, which can lead to better performance after handover. Implementation of these techniques can therefore improve end-user experience.

The disclosed techniques are beneficial, for example, in LTE anchoring scenarios with multiple LTE layers. In such examples, the disclosed techniques can enable ENDC-capable UEs to anchor on an LTE layer which can provide better ENDC performance when compared to the LTE layer that would be used under existing implementations. The techniques therefore reduce the likelihood of ENDC-capable UEs being penalised in performance once using NR NSA. Similar benefits can be obtained in other scenarios that involve multiple layers, such as dual connectivity (DC), carrier aggregation (CA), New Radio Dual Connectivity, NRDC, and New Radio Carrier Aggregation, NRCA.

The disclosed techniques can be further applied to a wide range of scenarios. In many of these applications, the implementation of a timer to wait for a MR relating to a higher priority frequency layer provides the operator with better control on network design. It also provides more control over UE behaviour in terms of frequency layer selection.

The techniques disclosed herein can take advantage of existing LTE A5 measurements and NR B1 measurements, and capitalise on existing procedures and features parametrisation. This provides for a simple and efficient implementation of the timer.

Other aspects and embodiments of the techniques described herein will be understood by those skilled in the art based on the description below and the accompanying drawings.

BRIEF DESCRIPTION OF THE DRAWINGS

Some of the embodiments contemplated herein will now be described more fully with reference to the accompanying drawings, in which.

DETAILED DESCRIPTION

Some of the embodiments contemplated herein will now be described more fully with reference to the accompanying drawings. Other embodiments, however, are contained within the scope of the subject-matter disclosed herein, and the disclosed subject-matter should not be construed as limited to only the embodiments set forth herein; rather, these embodiments are provided by way of example to convey the scope of the subject-matter to those skilled in the art.

Figure 4:
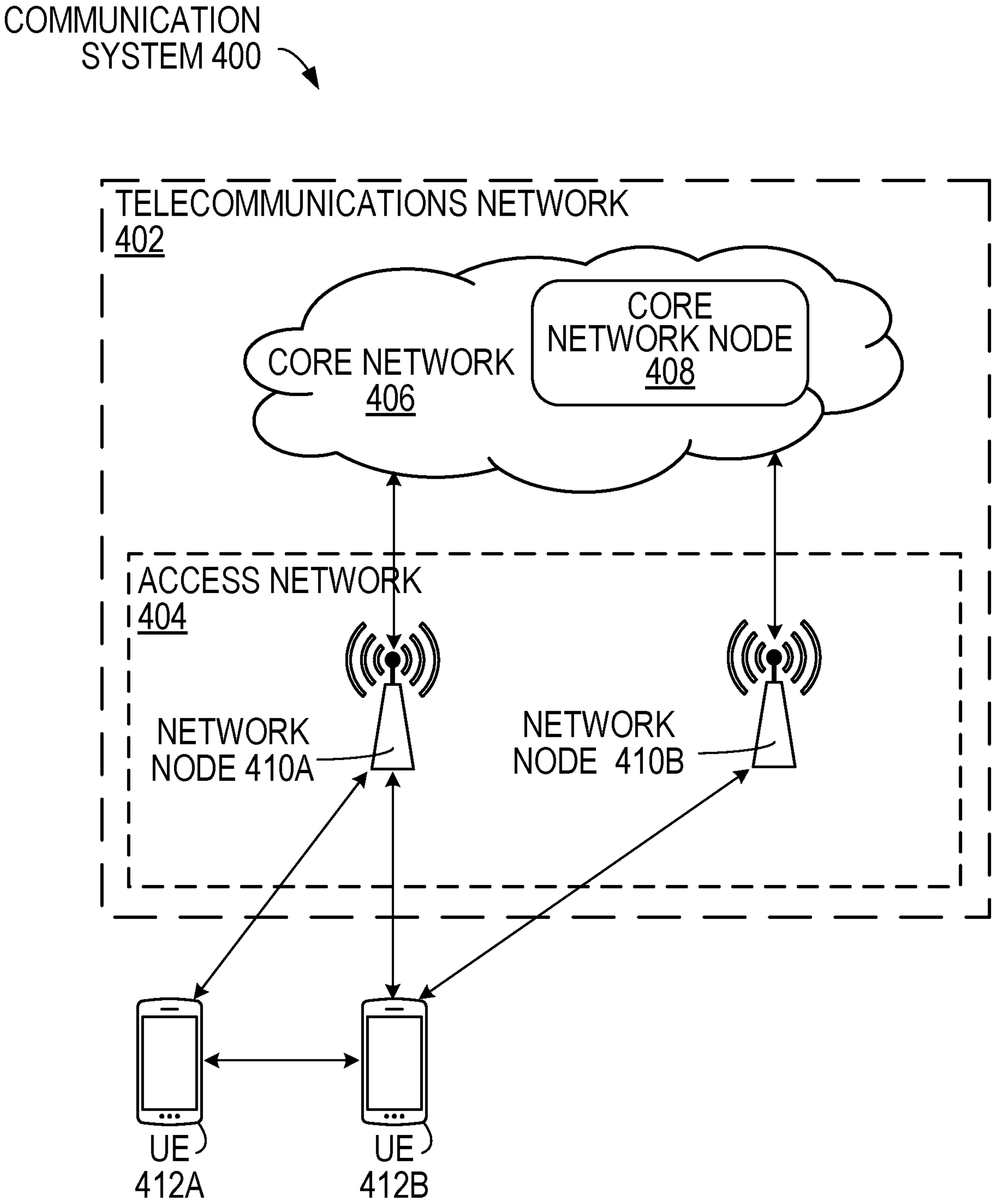
FIG. 4 is an example of a communication system in which the techniques described herein can be applied.

FIG. 4 shows an example of a communication system 400 in accordance with some embodiments. In the example, the communication system 400 includes a telecommunication network 402 that includes an access network 404, such as a RAN, and a core network 406, which includes one or more core network nodes 408. The access network 404 includes one or more radio access network (RAN) nodes, such as radio access network nodes 410*a* and 410*b* (one or more of which may be generally referred to as radio access network nodes 410), or any other similar 3rd Generation Partnership Project (3GPP) access node or non-3GPP access point. The radio access network nodes 410 facilitate direct or indirect connection of wireless devices (also referred to interchangeably herein as UEs), such as by connecting UEs 412*a*, and 412*b* (one or more of which may be generally referred to as UEs 412) to the core network 406 over one or more wireless connections. The RAN nodes 410 may be, for example, access points (APs) (e.g. radio access points), base stations (BSs) (e.g. radio base stations, Node Bs, evolved Node Bs (eNBs) and NR NodeBs (gNBs)).

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 400 may include any number of wired or wireless networks, network nodes, UEs, and/or any other components or systems that may facilitate or participate in the communication of data and/or signals whether via wired or wireless connections. The communication system 400 may include and/or interface with any type of communication, telecommunication, data, cellular, radio network, and/or other similar type of system.

The wireless devices/UEs 412 may be any of a wide variety of communication devices, including wireless devices arranged, configured, and/or operable to communicate wirelessly with the RAN nodes 410 and other communication devices. Similarly, the RAN nodes 410 are arranged, capable, configured, and/or operable to communicate directly or indirectly with the UEs 412 and/or with other network nodes or equipment in the telecommunication network 402 to enable and/or provide network access, such as wireless network access, and/or to perform other functions, such as administration in the telecommunication network 402.

The core network 406 includes one more core network nodes (e.g. core network node 408) that are structured with hardware and software components. Features of these components may be substantially similar to those described with respect to the wireless devices/UEs, access network nodes, such that the descriptions thereof are generally applicable to the corresponding components of the core network node 408. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

As a whole, the communication system 400 of FIG. 4 enables connectivity between the wireless devices/UEs and RAN nodes/network nodes. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g. 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 402 is a cellular network that implements 3GPP standardized features. Accordingly, the telecommunications network 402 may support network slicing to provide different logical networks to different devices that are connected to the telecommunication network 402. For example, the telecommunications network 402 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 412 are configured to transmit and/or receive information without direct human interaction. For instance, a UE may be designed to transmit information to the access network 404 on a predetermined schedule, when triggered by an internal or external event, or in response to requests from the access network 404. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MRDC), such as ENDC.

Figure 5:
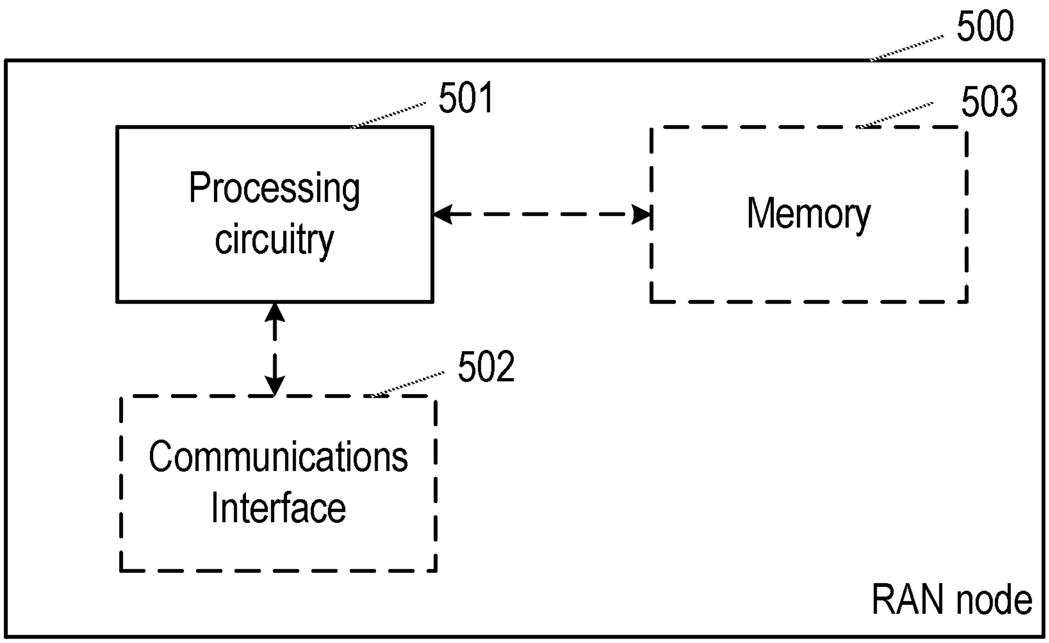
FIG. 5 is a block diagram of a RAN node according to various embodiments.

FIG. 5 is a simplified block diagram of a RAN node 500 according to various embodiments that can be used to implement the techniques described herein. It will be appreciated that the RAN node 500 may comprise one or more virtual machines running different software and/or processes. The RAN node 500 may therefore comprise one or more servers, switches and/or storage devices and/or may comprise cloud computing infrastructure that runs the software and/or processes.

The processing circuitry 501 controls the operation of the RAN node 500 and can implement the methods described herein in relation to the RAN node 500. The processing circuitry 501 can comprise one or more processors, processing units, multi-core processors or modules that are configured or programmed to control the RAN node 500 in the manner described herein. In particular implementations, the processing circuitry 501 can comprise a plurality of software and/or hardware modules that are each configured to perform, or are for performing, individual or multiple steps of the method described herein in relation to the RAN node 500.

In some embodiments, the RAN node 500 may optionally comprise a communications interface 502. The communications interface 502 can be for use in communicating with other nodes, such as other virtual nodes, or wireless devices or user equipments (UEs). For example, the communications interface 502 can be configured to transmit to and/or receive from wireless devices, UEs, other nodes or network functions requests, resources, information, data, signals, or similar. The processing circuitry 501 may be configured to control the communications interface 502 of the RAN node 500 to transmit to and/or receive from wireless devices, UEs, other nodes or network functions requests, resources, information, data, signals, or similar.

Optionally, the RAN node 500 may comprise a memory 503. In some embodiments, the memory 503 can be configured to store program code that can be executed by the processing circuitry 501 to perform the method described herein in relation to the RAN node 500. Alternatively or in addition, the memory 503 can be configured to store any requests, resources, information, data, signals, or similar that are described herein. The processing circuitry 501 may be configured to control the memory 503 to store any requests, resources, information, data, signals, or similar that are described herein.

Figure 6:
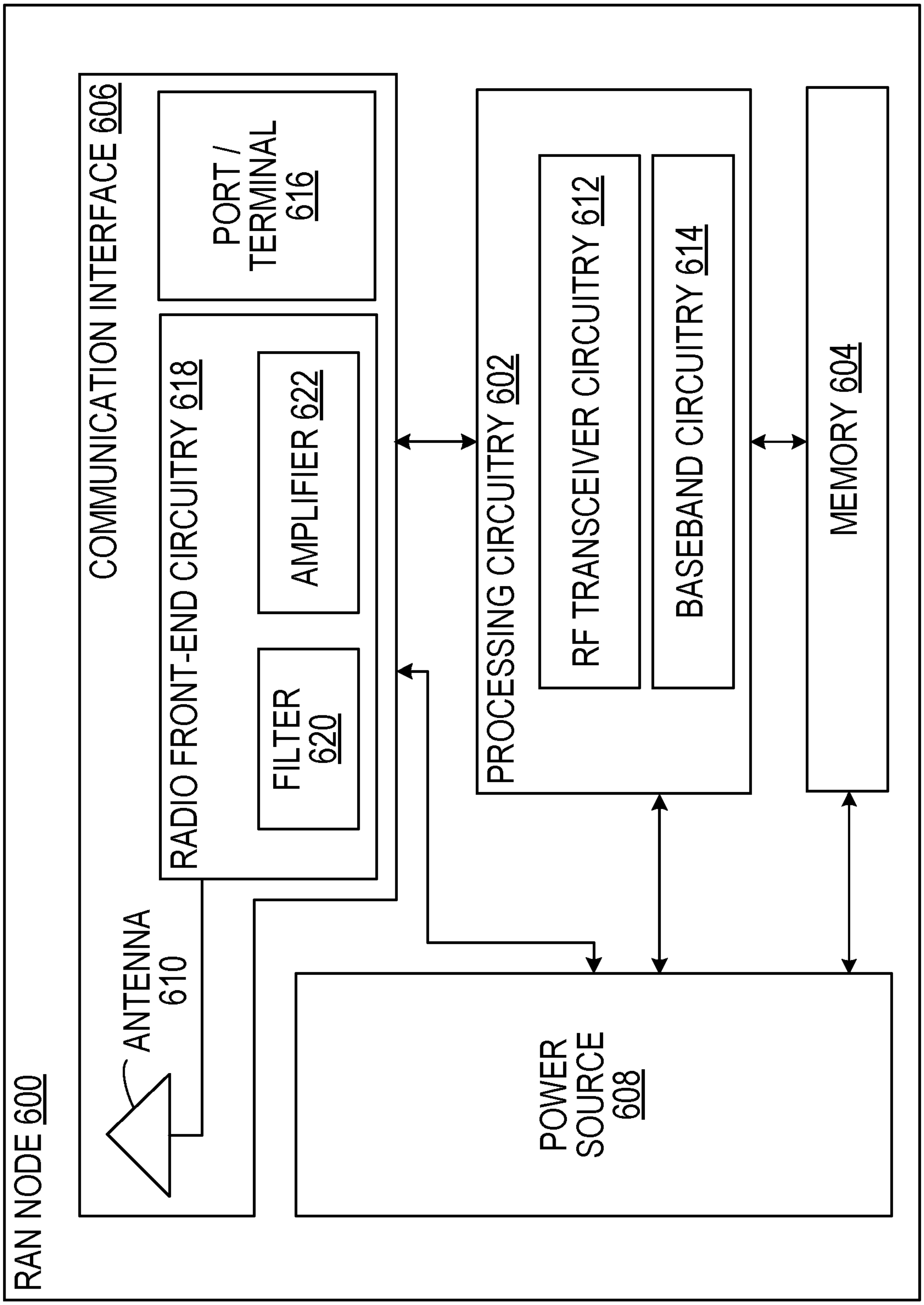
FIG. 6 is a block diagram of a network node according to various embodiments.

FIG. 6 shows a RAN node 600 in accordance with some embodiments. As used herein, RAN node refers to equipment capable, configured, arranged and/or operable to communicate directly or indirectly with a UE and/or with other RAN nodes or equipment, in a telecommunication network. Examples of RAN nodes include, but are not limited to, radio access network nodes such as access points (APs) (e.g. radio access points), base stations (BSs) (e.g. radio base stations, Node Bs, evolved Node Bs (eNBs) and NR NodeBs (gNBs)).

Base stations may be categorised based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A RAN node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of RAN nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g. Evolved Serving Mobile Location Centers (E-SMLCs)), and/or Minimization of Drive Tests (MDTs).

The RAN node 600 includes processing circuitry 602, a memory 604, a communication interface 606, and a power source 608, and/or any other component, or any combination thereof. The RAN node 600 may be composed of multiple physically separate components (e.g. a NodeB component and a RNC component, or a BTS component and a BSC component, etc.), which may each have their own respective components. In certain scenarios in which the RAN node 600 comprises multiple separate components (e.g. BTS and BSC components), one or more of the separate components may be shared among several network nodes. For example, a single RNC may control multiple NodeBs. In such a scenario, each unique NodeB and RNC pair, may in some instances be considered a single separate RAN node. In some embodiments, the RAN node 600 may be configured to support multiple radio access technologies (RATs). In such embodiments, some components may be duplicated (e.g. separate memory 604 for different RATs) and some components may be reused (e.g. a same antenna 610 may be shared by different RATs). The RAN node 600 may also include multiple sets of the various illustrated components for different wireless technologies integrated into RAN node 600, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 600.

The processing circuitry 602 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other RAN node 600 components, such as the memory 604, to provide RAN node 600 functionality. For example, the processing circuitry 602 may be configured to cause the network node to perform the methods as described with reference to FIG. 10.

In some embodiments, the processing circuitry 602 includes a system on a chip (SOC). In some embodiments, the processing circuitry 602 includes one or more of radio frequency (RF) transceiver circuitry 612 and baseband processing circuitry 614. In some embodiments, the radio frequency (RF) transceiver circuitry 612 and the baseband processing circuitry 614 may be on separate chips (or sets of chips), boards, or units, such as radio units and digital units. In alternative embodiments, part or all of RF transceiver circuitry 612 and baseband processing circuitry 614 may be on the same chip or set of chips, boards, or units.

The memory 604 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 602. The memory 604 may store any suitable instructions, data, or information, including a computer program, software, an application including one or more of logic, rules, code, tables, and/or other instructions capable of being executed by the processing circuitry 602 and utilized by the RAN node 600. The memory 604 may be used to store any calculations made by the processing circuitry 602 and/or any data received via the communication interface 606. In some embodiments, the processing circuitry 602 and memory 604 is integrated.

The communication interface 606 is used in wired or wireless communication of signalling and/or data between network nodes, the access network, the core network, and/or a UE. As illustrated, the communication interface 606 comprises port(s)/terminal(s) 616 to send and receive data, for example to and from a network over a wired connection.

In embodiments, the communication interface 606 also includes radio front-end circuitry 618 that may be coupled to, or in certain embodiments a part of, the antenna 610. Radio front-end circuitry 618 comprises filters 620 and amplifiers 622. The radio front-end circuitry 618 may be connected to an antenna 610 and processing circuitry 602. The radio front-end circuitry may be configured to condition signals communicated between antenna 610 and processing circuitry 602. The radio front-end circuitry 618 may receive digital data that is to be sent out to other RAN nodes or UEs via a wireless connection. The radio front-end circuitry 618 may convert the digital data into a radio signal having the appropriate channel and bandwidth parameters using a combination of filters 620 and/or amplifiers 622. The radio signal may then be transmitted via the antenna 610. Similarly, when receiving data, the antenna 610 may collect radio signals which are then converted into digital data by the radio front-end circuitry 618. The digital data may be passed to the processing circuitry 602. In other embodiments, the communication interface may comprise different components and/or different combinations of components.

In certain alternative embodiments, the RAN node 600 does not include separate radio front-end circuitry 618, instead, the processing circuitry 602 includes radio front-end circuitry and is connected to the antenna 610. Similarly, in some embodiments, all or some of the RF transceiver circuitry 612 is part of the communication interface 606. In still other embodiments, the communication interface 606 includes one or more ports or terminals 616, the radio front-end circuitry 618, and the RF transceiver circuitry 612, as part of a radio unit (not shown), and the communication interface 606 communicates with the baseband processing circuitry 614, which is part of a digital unit (not shown).

The antenna 610 may include one or more antennas, or antenna arrays, configured to send and/or receive wireless signals. The antenna 610 may be coupled to the radio front-end circuitry 618 and may be any type of antenna capable of transmitting and receiving data and/or signals wirelessly. In certain embodiments, the antenna 610 is separate from the RAN node 600 and connectable to the RAN node 600 through an interface or port.

The antenna 610, communication interface 606, and/or the processing circuitry 602 may be configured to perform any receiving operations and/or certain obtaining operations described herein as being performed by the network node. Any information, data and/or signals may be received from a UE, another network node and/or any other network equipment. Similarly, the antenna 610, the communication interface 606, and/or the processing circuitry 602 may be configured to perform any transmitting operations described herein as being performed by the RAN node. Any information, data and/or signals may be transmitted to a UE, another RAN node and/or any other network equipment.

The power source 608 provides power to the various components of RAN node 600 in a form suitable for the respective components (e.g. at a voltage and current level needed for each respective component). The power source 608 may further comprise, or be coupled to, power management circuitry to supply the components of the RAN node 600 with power for performing the functionality described herein. For example, the RAN node 600 may be connectable to an external power source (e.g. the power grid, an electricity outlet) via an input circuitry or interface such as an electrical cable, whereby the external power source supplies power to power circuitry of the power source 608. As a further example, the power source 608 may comprise a source of power in the form of a battery or battery pack which is connected to, or integrated in, power circuitry. The battery may provide backup power should the external power source fail.

Embodiments of the RAN node 600 may include additional components beyond those shown in FIG. 6 for providing certain aspects of the RAN node's functionality, including any of the functionality described herein and/or any functionality necessary to support the subject-matter described herein. For example, the RAN node 600 may include user interface equipment to allow input of information into the RAN node 600 and to allow output of information from the RAN node 600. This may allow a user to perform diagnostic, maintenance, repair, and other administrative functions for the network node 600.

Figure 7:
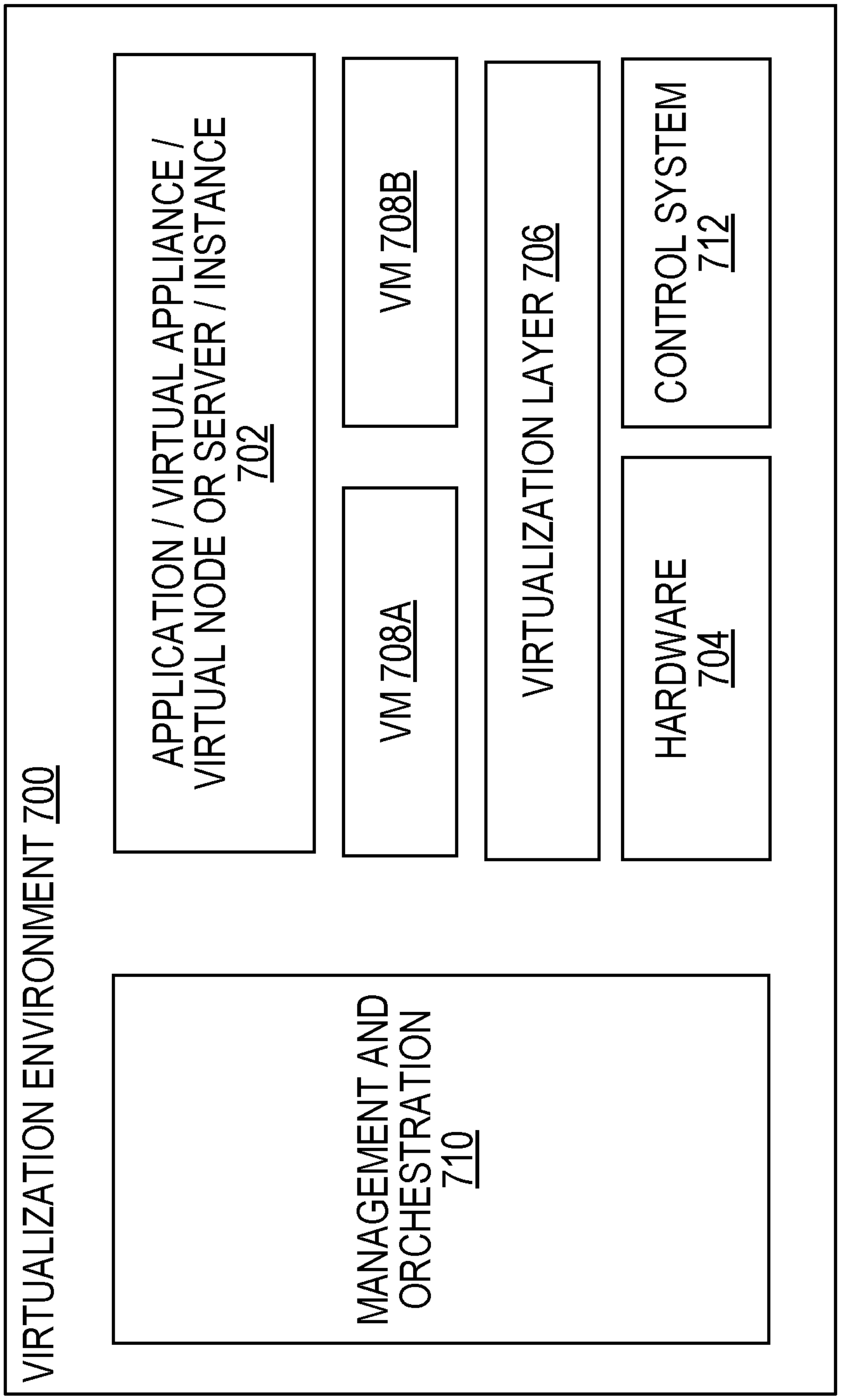
FIG. 7 is a block diagram illustrating a virtualization environment in which functions implemented by some embodiments may be virtualized.

FIG. 7 is a block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, for example a RAN node, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 700 hosted by one or more of hardware nodes, such as a hardware computing device that operates as a radio access network node, a wireless device/UE, or a core network node.

Applications 702 (which may alternatively be called software instances, virtual appliances, network functions, virtual nodes, virtual network functions, etc.) are run in the virtualization environment 700 to implement some of the features, functions, and/or benefits of some of the embodiments disclosed herein.

Hardware 704 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 706 (also referred to as hypervisors or virtual machine monitors (VMMs)), provide VMs 708*a* and 708*b* (one or more of which may be generally referred to as VMs 708), and/or perform any of the functions, features and/or benefits described in relation with some embodiments described herein. The virtualization layer 706 may present a virtual operating platform that appears like networking hardware to the VMs 708.

The VMs 708 comprise virtual processing, virtual memory, virtual networking or interface and virtual storage, and may be run by a corresponding virtualization layer 706. Different embodiments of the instance of a virtual appliance 702 may be implemented on one or more of VMs 708, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 708 may be a software implementation of a physical machine that runs programs as if they were executing on a physical, non-virtualized machine. Each of the VMs 708, and that part of hardware 704 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 708 on top of the hardware 704 and corresponds to the application 702.

Hardware 704 may be implemented in a standalone network node with generic or specific components. Hardware 704 may implement some functions via virtualization. Alternatively, hardware 704 may be part of a larger cluster of hardware (e.g. such as in a data centre or CPE) where many hardware nodes work together and are managed via management and orchestration 710, which, among others, oversees lifecycle management of applications 702. In some embodiments, hardware 704 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signalling can be provided with the use of a control system 712 which may alternatively be used for communication between hardware nodes and radio units.

As noted above, under the current ENDCHO mechanism, the ENDC-capable LTE frequency layer selected for the handover will be the layer corresponding to the first measurement report received by the RAN node. Although the RAN node prioritises a list of frequency layers for measurement by the UE, the decision of which LTE frequency layer to measure first resides with the UE, and so the frequency layer that the UE hands over to may be sub-optimal. Thus, the disclosed techniques facilitate the selection of a higher-priority anchor layer for handover by the RAN node waiting for up to a predetermined time period to receive a measurement report relating to a frequency layer of a higher priority level.

Figure 8:
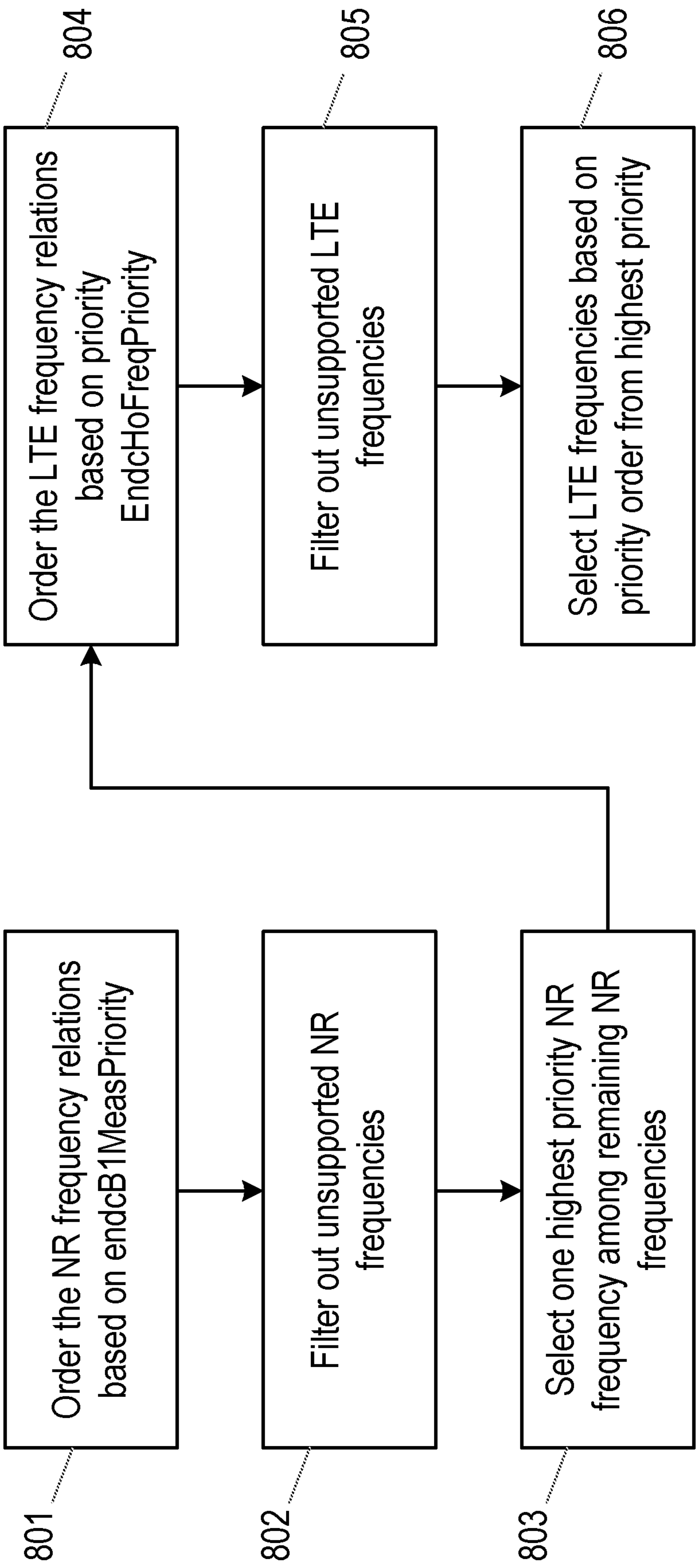
FIG. 8 is a flow chart illustrating a method of selecting measurement frequencies.

FIG. 8 is a flow chart illustrating a method performed by a RAN node for selecting or prioritising frequencies for a UE to measure. Prior to an ENDCHO, a serving RAN node is required to identify a NR carrier and a suitable LTE anchor for the handover. To do so, the RAN node first configures the UE to send NR B1 MRs for specific NR frequency layers, and to send A5 MRs for specific LTE frequency layers. FIG. 8 illustrates a possible process by which a RAN node can determine which NR and LTE frequency layers to request the UE to measure.

At step 801, the RAN node considers the NR frequency layers available for use as an ENDC carrier under 5G NSA, and determines a prioritised list of the NR frequency layers. The priority of each frequency layer is assigned by a network operator and indicated by the parameter, endcB1MeasPriority. The layers assigned a higher priority correspond to the ones that the RAN node would prefer the UE to use as a carrier for ENDC. At step 802, the RAN node removes from this list any NR frequency layers that cannot support ENDC, either because the NR frequency layer cannot support ENDC or because the NR frequency layer is not supported by the UE. At step 803, the RAN node selects the highest priority NR frequency layer from the remaining frequencies in the prioritised NR list.

At step 804, the RAN node considers the LTE frequency layers available for use as a LTE anchor for ENDC under 5G NSA, and determines a prioritised list of the LTE frequency layers. The priority of each frequency layer is indicated by the parameter, EndcHoFreqPriority. The layers assigned a higher priority are the ones that the RAN node would prefer the UE to use as an anchor for ENDC. Typically, the higher priority layers can be those with a higher bandwidth. At step 805, the RAN node removes from the list any LTE frequencies that cannot be used by the UE for ENDC. This could be because the LTE frequency layer is not configured to be used as an anchor for ENDC; or the LTE frequency layer is not supported by the UE. Finally, at step 806, the RAN node selects one or more of the highest priority LTE frequencies from the remaining frequencies in the prioritised LTE list.

After the selection process depicted in FIG. 8 has been performed, the NR and LTE frequency layers are combined into a maximum of three RRC Reconfiguration messages to be sent to the UE. If not all of the available LTE frequency layers can be included in these messages, the parameter EndcHoFreqPriority is used to select the highest priority LTE frequency layers. The available NR frequency layers are each allocated to one of a maximum of four priority groups according to the assigned endcB1MeasPriority values, as shown, for example, in Table 1. If there are NR frequency layers in more than one priority group, there will be a RRC reconfiguration message for each priority group. Regardless of the number of NR frequency layers and their prioritisation, the potential LTE frequency layers are included in the same RRC reconfiguration message.

TABLE 1

| Priority Group | endcB1MeasPriority |
|---|---|
| 1 | 7, 6 |
| 2 | 5, 4 |
| 3 | 3, 2, 1, 0 |
| NA | −1 |

The RRC reconfiguration message is sent to the UE to request that the UE measures the selected NR frequency layer and the selected LTE frequency layers. The UE decides which of these LTE frequency layers to measure first.

Figure 1:
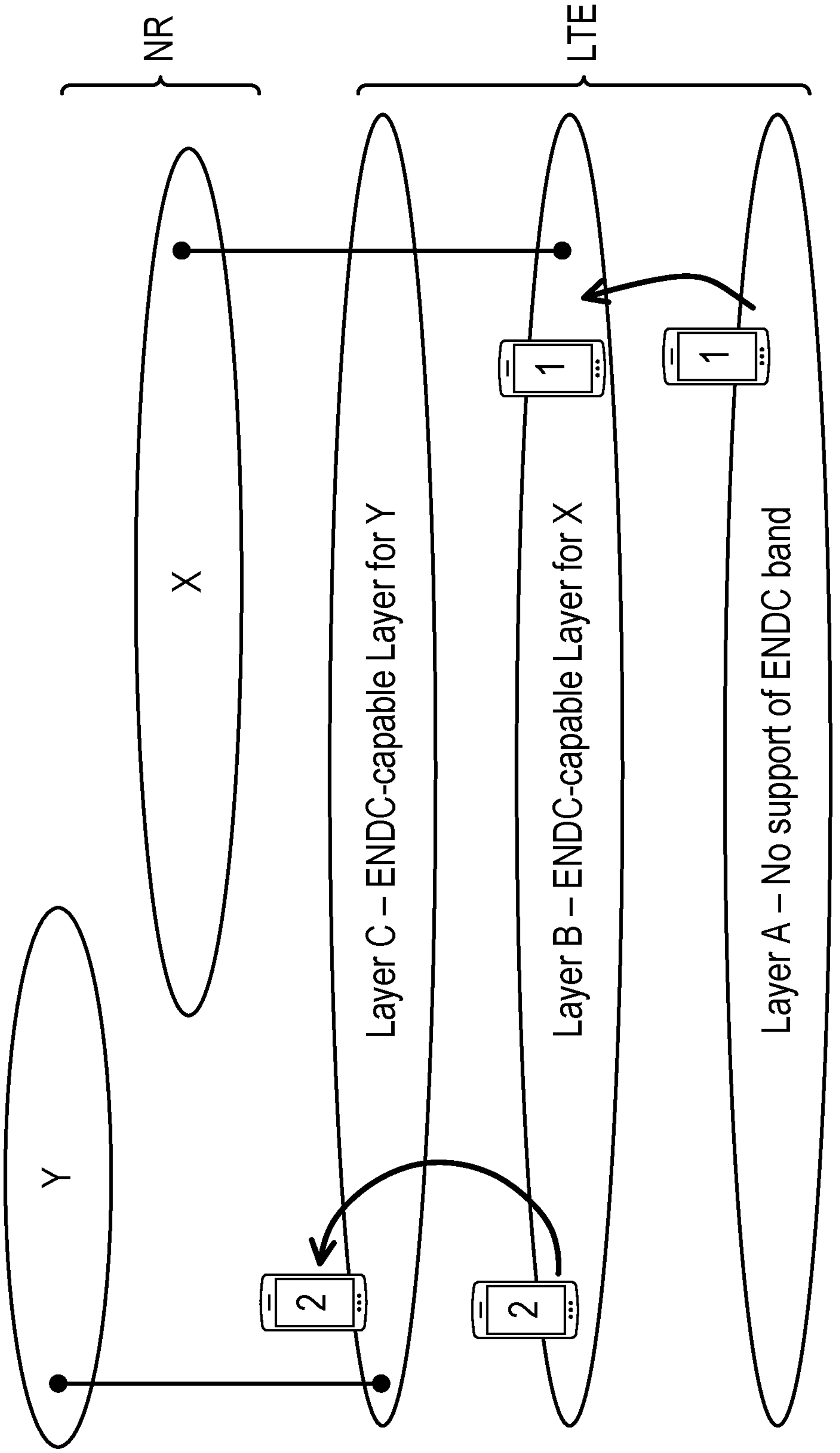
FIG. 1 is an illustration of two ENDC-triggered handover scenarios.
Figure 2:
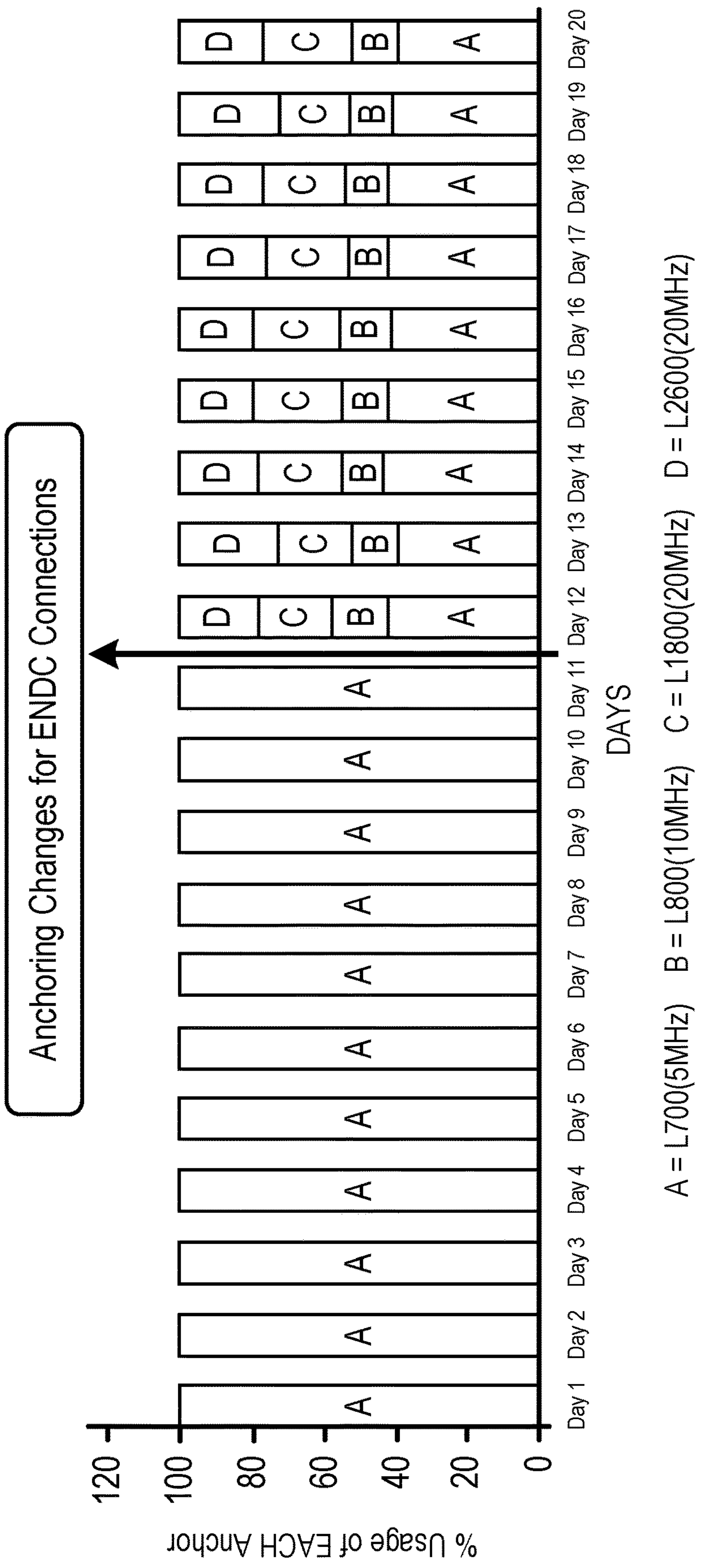
FIG. 2 is an example of data showing the percentage usage of different LTE frequency layers as LTE anchors for ENDC.
Figure 3:
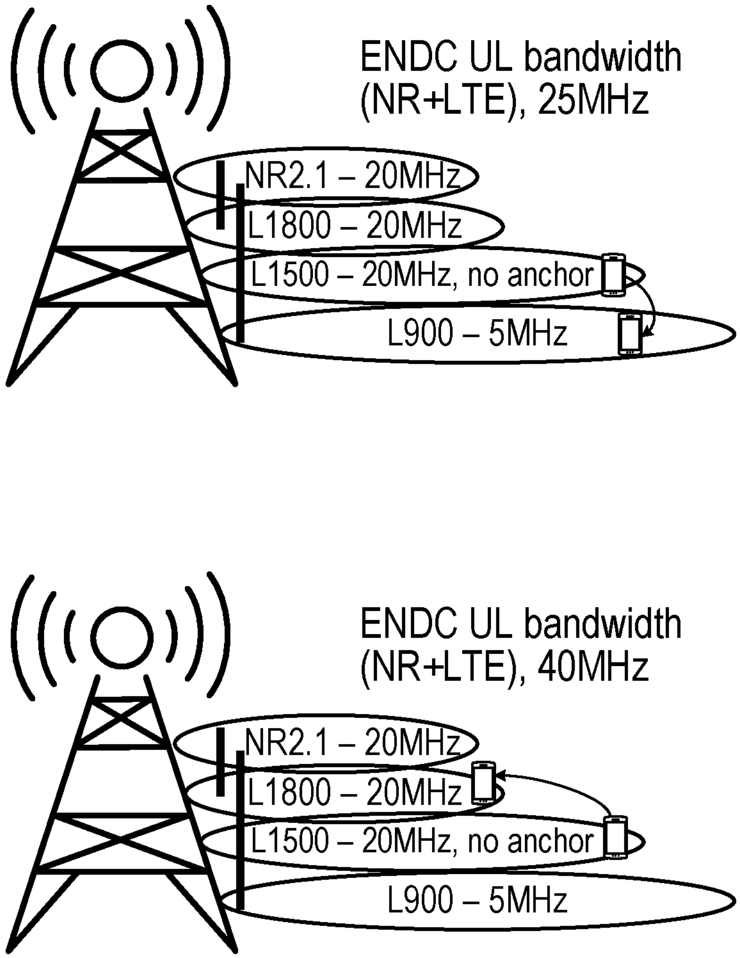
FIG. 3 is a further illustration of two ENDC-triggered handover scenarios.

As was shown in FIG. 2, it has been observed that UEs tend to measure the lower-band LTE frequencies first, and therefore the MRs corresponding to these lower-band LTE frequencies are often delivered to the RAN node before MRs corresponding to higher-band LTE frequencies. Consequently, the lower-band frequencies are more frequently used as LTE anchors. Lower-band LTE frequencies usually have lower bandwidth than higher-band LTE frequencies, and so this situation can lead to poorer anchoring selection since the achievable performance during ENDC is driven by the total bandwidth of the NR carrier plus the LTE anchor.

Thus, it is proposed that, after receiving a first MR, the RAN node should wait, for up to a given time period, to receive a second MR corresponding to a higher priority LTE frequency layer. By waiting this additional time, the RAN node may be able to consider a second MR alongside the first MR, which can lead to the selection of a higher priority LTE layer (e.g. having a higher bandwidth) for the handover.

Figure 9:
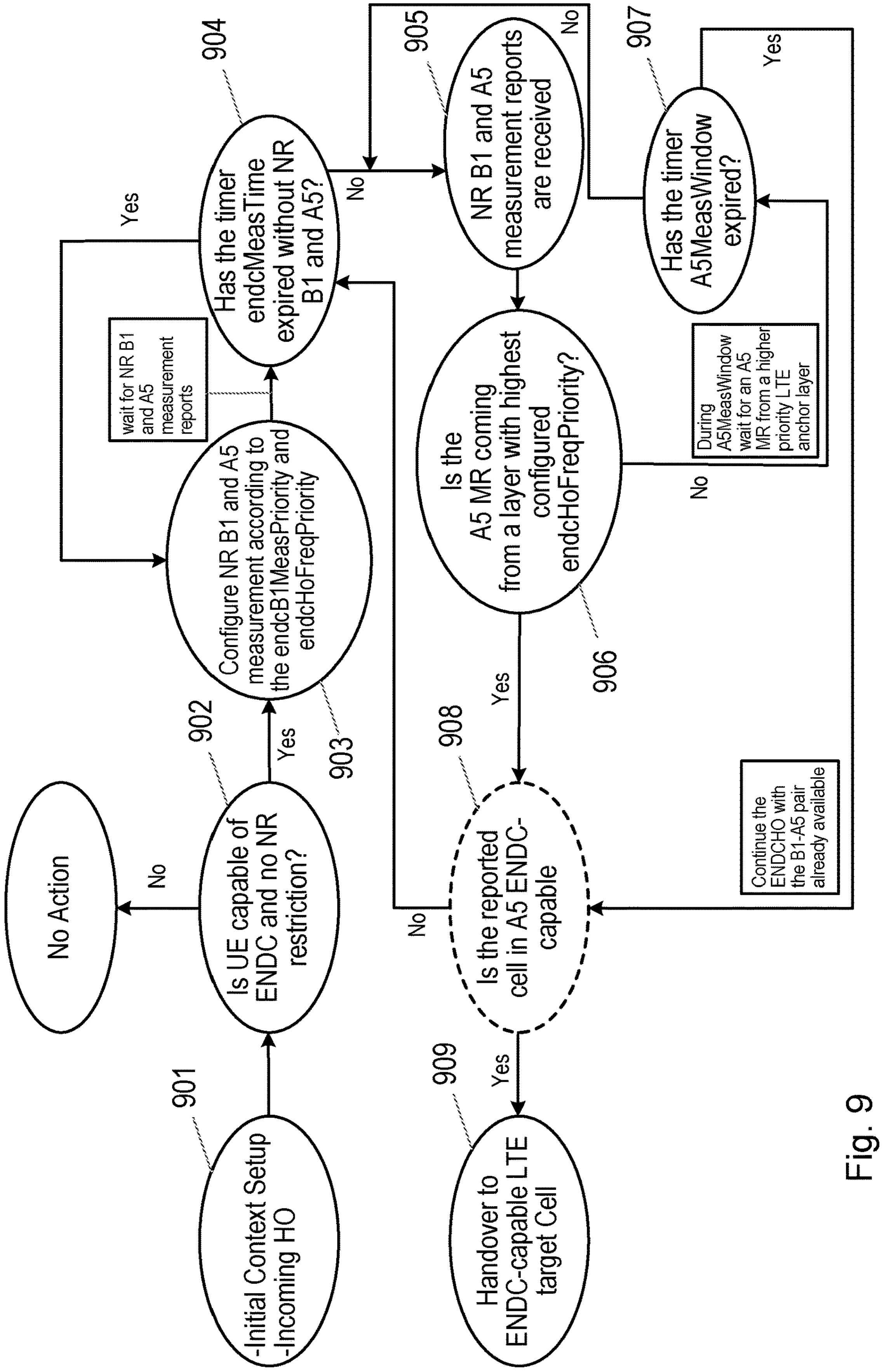
FIG. 9 is a schematic illustrating embodiments of the techniques described herein.

FIG. 9 is a flow chart illustrating an implementation of the techniques described herein according to various embodiments of the present disclosure. The method can be performed by RAN node 410, 500, 600.

The method starts at step 901 in which the UE performs an initial context setup in a cell of the RAN node, or the UE is handed over to a cell of the RAN node.

At step 902, the RAN node determines whether the UE is capable of ENDC, and whether the UE is free from any restriction on the use of NR carriers (e.g. is the UE capable of using any of the available NR carriers). If the answer to the first of these is 'no', or the UE is not capable of operating on any of the available NR carriers, then an ENDCHO is not suitable and no further action is taken by the RAN node. However, if the UE is ENDCHO capable and is able to operate on at least one of the available NR frequencies, then the RAN node will proceed to step 903.

At step 903, the RAN node sends one or more RRC reconfiguration messages to the UE to configure the UE to perform NR B1 measurements and A5 measurements. The RAN node can determine the frequency layers that the UE is to measure as described in relation to FIG. 8. The priority of the available frequency layers is indicated by endcB1MeasPriority and endcHoFreqPriority respectively. The priority values are assigned by the network operator. The RAN node then waits to receive any NR B1 and A5 MRs for up to a predetermined length of time, endcMeasTime (step 904). If the endcMeasTime timer expires without any measurement reports being received, the RAN node will reconfigure the UE to perform measurements by repeating step 903.

If the RAN node receives NR B1 and A5 MRs before the endcMeasTime timer expires (step 905), the RAN node will, at step 906, determine whether the A5 MR relates to a LTE frequency layer with the highest assigned endcHOFreqPriority out of the frequency layers in the prioritised list that the RAN node requested the UE to measure in step 903. As noted above, the highest priority frequency layer can be a layer that is ENDC capable, or the frequency layer providing the highest available spectrum for ENDC.

If the A5 MR relates to the highest priority LTE frequency layer, then the RAN node can initiate a handover towards the frequency layer of the first MR (step 909). However, if the RAN node does not accept the NR configuration, then the UE will be inhibited from measuring NR for a time period, e.g. for the duration of a timer: B1InhibitTimer. In some cases, prior to initiating the handover at step 909, the RAN node will first check whether the frequency layer that will be used for the handover is ENDC-capable (step 908), although this is unnecessary in embodiments where step 805 in FIG. 8 is performed to select frequency layers to measure.

If the frequency layer is ENDC-capable, the RAN node will initiate the handover (step 909). If step 908 is performed and it is determined that the frequency layer is not ENDC-capable, the RAN node will return to step 904 instead and wait to receive further NR B1 and A5 measurement reports (step 904).

However, at step 906, if the first received A5 MR does not relate to the LTE frequency layer with the highest assigned priority (e.g. highest assigned endcHOFreqPriority), the RAN node starts a timer that has a predetermined duration to wait for a measurement report for a frequency layer that has the highest priority. The time window represented by the timer can be defined by a configurable parameter, A5MeasWindow. During this time window the RAN node waits to receive from the UE a second A5 MR that relates to a LTE frequency layer with a higher priority (e.g. a higher endcHOFreqPriority).

If a second A5 MR is received relating to a LTE frequency layer with a higher priority and the A5MeasWindow timer has not expired (represented by the 'No' loop from step 907 through step 905), in step 906 it is checked whether the LTE frequency layer that the second A5 MR relates to is the highest priority layer. If not, the timer continues and the RAN node waits for further A5 MRs to be received.

Once the timer expires ('Yes' branch of step 907) the ENDCHO will be triggered towards the highest-priority layer for which an A5 MR has been received in step 905 (step 909). Thus the handover in step 909 may be to the layer that the second A5 MR relates to, if it is a higher priority than the layer than the first A5 MR relates to. Alternatively the handover in step 909 may be to the layer that the first A5 MR relates to, if it is a higher priority than the layer than the second A5 MR relates to. As noted above, prior to initiating the handover at step 909, the RAN node may first check whether the frequency layer intended for use in the handover is ENDC-capable (step 908).

On the other hand, if the A5MeasWindow timer expires (the 'Yes' branch from step 907) before such a second A5 MR is received, the ENDCHO is triggered towards the LTE frequency layer for which the first MR was received (step 909). Optionally, the RAN node may first verify that the frequency layer corresponding to the first received A5 MR is ENDC-capable (step 908).

Thus, the example implementation depicted in FIG. 9 increases the likelihood of a UE transitioning to a higher priority LTE anchor layer and can therefore provide better aggregated performance compared with existing ENDCHO methods. However, it should be understood that this method is not limited to ENDCHO scenarios. The disclosed timer configuration, used to implement a time period for waiting for a measurement report from a higher priority frequency layer, carrier or cell, is applicable to any handover scenario in which there is a choice of layers (or carriers or cells) that could be used for the handover. The disclosed techniques improve end-user performance by increasing the likelihood of a higher priority (i.e. more appropriate) layer being used for the handover.

The techniques disclosed herein can also be used more generally in the following scenarios: for LTE inter-frequency target selection (i.e. for handing over to a different LTE frequency layer in conventional 4G network operation); as a method for improving the prioritisation of LTE frequencies; and as a New Radio Dual Connectivity (NRDC) anchor selection strategy (e.g. a method for improving NR low-band anchor selection by a mmWave NR layer). Furthermore, the disclosed techniques could also be used in a NR carrier aggregation scenario, where the use of the timer can allow for a better band combination to be found.

Figure 10:
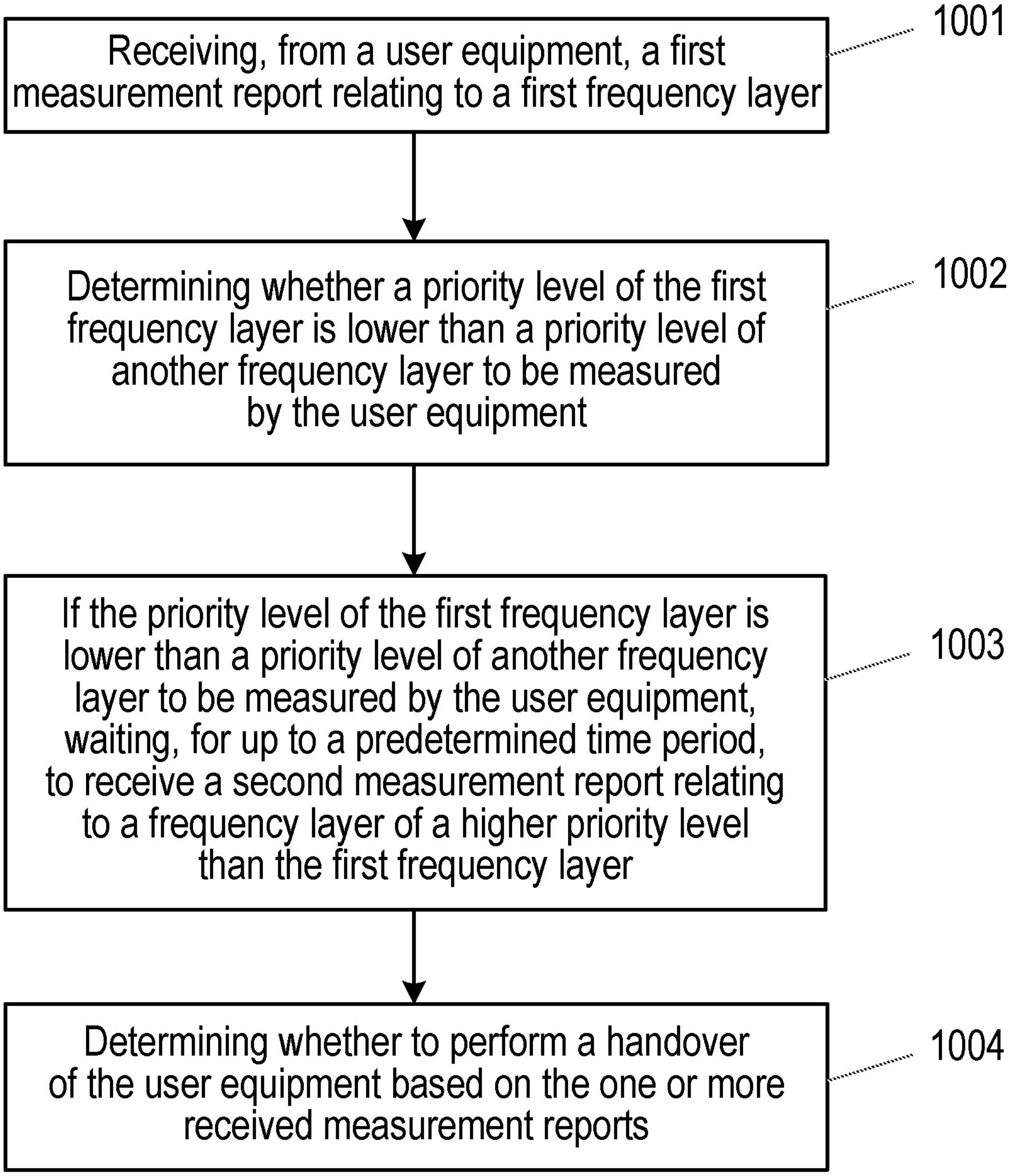
FIG. 10 shows a method performed by a RAN node according to the techniques described herein.

FIG. 10 is a flow chart illustrating a method performed by a RAN node according to various embodiments of the present disclosure.

The method comprises a step 1001 of receiving, from a user equipment, a first measurement report relating to a first frequency layer. The term frequency layer can refer to part of a frequency band or a frequency sub-band. Furthermore, the term frequency layer can be used to identify a particular spectrum asset deployed and used in an operator's network. In some embodiments, a frequency layer may be specified by an absolute radio-frequency channel number (ARFCN) together with a bandwidth. A frequency layer is sometimes referred to as a carrier frequency. In some embodiments, the first frequency layer is an LTE frequency layer. In other embodiments, the first frequency layer can relate to any other RAT, such as E-UTRAN or NR.

In some embodiments, prior to receiving the first measurement report, the method also comprises sending, to the user equipment, a request to measure a plurality of frequency layers. The plurality of frequency layers may be LTE frequency layers. In other embodiments, the plurality of frequency layers can be of any other RAT such as E-UTRAN and/or NR.

Each of the plurality of frequency layers can have a respective priority level. In some embodiments, the priority level is indicated by an EndcHoFreqPriority parameter. The respective priority levels can be based on the suitability of the frequency layer for a given purpose. In some embodiments, this purpose is ENDCHO. The purpose could also be, for example, LTE inter-frequency target layer selection, anchor layer selection in a multi-layer LTE network, NRDC anchor layer selection and/or carrier aggregation. The priority level may be related to the frequency itself and/or available bandwidth. In some embodiments, the respective priority levels for each of the plurality of frequency layers are assigned by a network operator.

The RAN node may select the plurality of frequency layers for the user equipment to measure on from a set of available frequency layers. The plurality of frequency layers can be selected based on at least one of: a capability of the user equipment; the respective priority levels of the plurality of frequency layers; respective capabilities of the plurality of frequency layers; a capability of the user equipment to use the frequency layer; a capability of the frequency layer to support ENDC; a capability of the frequency layer to support NRDC; and a capability of the frequency layer to support New Radio Carrier Aggregation (NRCA). For example, a capability of the user equipment could be whether the UE is capable of supporting ENDC (referred to as an ENDC-capable UE), and/or the whether the UE is capable of supporting ENDC on a specific frequency. Alternatively, a capability of the user equipment could be whether the UE is capable of supporting NRDC (referred to as a NRDC-capable UE), and/or the whether the UE is capable of supporting NRDC on specific frequencies. A capability of the user equipment could also be whether the UE is capable of supporting NRCA (referred to as a NRCA-capable UE), and/or the whether the UE is capable of supporting NRCA on specific frequencies. Other UE capabilities could be the ability of the UE to use one or more of: NR, Dynamic Spectrum Sharing (DSS), and Quadrature Amplitude Modulation (QAM), e.g. uplink (UL) 256-QAM.

FIG. 10 further comprises a step 1002 of determining whether a priority level of the first frequency layer is lower than a priority level of another frequency layer to be measured by the user equipment. Such a frequency layer to be measured by the user equipment could be any of the plurality of frequency layers that the RAN node requested the UE to measure.

If the priority level of the first frequency layer is lower than a priority level of another frequency layer to be measured by the user equipment, then in step 1003 the RAN node waits, for up to a predetermined time period, to receive a second measurement report relating to a frequency layer of a higher priority level than the first frequency layer. The time period could be started after the first measurement report is received. In some embodiments, the time period is a configurable parameter. This parameter could be denoted, for example, UeMeasControl::A5MeasWindow. The predetermined time period could be, for example, A5MeasWindow=40 ms. In some embodiments, the predetermined time period has a value in the range of 0 to 2000 ms (ms=millisecond).

FIG. 10 further comprises a step 1004 of determining whether to perform a handover of the user equipment based on the one or more received measurement reports. This could include determining to perform a handover of the user equipment to the frequency layer having the highest priority for which a measurement report has been received. Thus, in some embodiments, the target frequency layer for the handover will be the frequency layer with the highest priority out of the first and second frequency layers.

If it is determined that a handover should be performed, the method of FIG. 10 may further include a step of initiating the handover. In some embodiments, the handover is an ENDCHO to a LTE anchor layer. In these embodiments, determining whether to perform a handover may be further based on whether the frequency layers for which measurement reports have been received support ENDC. Thus, the RAN node may verify that the target frequency layer is ENDC-capable prior to initiating the handover.

In some embodiments, the handover may be any inter-frequency handover, for example a LTE inter-frequency handover or a NR inter-frequency handover. The handover may be for the purpose of selecting a new LTE anchor in a LTE multi-layer scenario. The handover may be a NRDC-triggered handover. A NRDC-triggered handover is a handover to enable NRDC to be used by the UE. In other embodiments, the handover may be to a frequency layer that can support carrier aggregation. Such a handover could be to enable carrier aggregation to be used by the user equipment, or, if carrier aggregation is already being used by the UE, to improve the performance of carrier aggregation. For example, the handover may be to a frequency layer to enable NRCA to be used by the UE.

In some embodiments, the UE is capable of one or more of: ENDC (i.e. ENDC-capable), NRDC (i.e. NRDC-capable) and NRCA (i.e. NRCA-capable). In some of these embodiments, prior to a handover, the user equipment is connected to a frequency layer that does not support ENDC, NRDC and/or NRCA.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A method performed by a radio access network (RAN) node, the method comprising:

receiving, from a user equipment, a first measurement report relating to a first frequency layer;

determining whether a priority level of the first frequency layer is lower than a priority level of another frequency layer to be measured by the user equipment;

if the priority level of the first frequency layer is lower than a priority level of another frequency layer to be measured by the user equipment, waiting, for up to a predetermined time period, to receive a second measurement report relating to a frequency layer of a higher priority level than the first frequency layer; and determining whether to perform a handover of the user equipment based on the one or more received measurement reports.

2. The method as claimed in claim 1, further comprising:

prior to receiving the first measurement report, sending, to the user equipment, a request to measure a plurality of frequency layers.

3. The method as claimed in claim 2, wherein each of the plurality of frequency layers has a respective priority level.

4. The method as claimed in claim 2, further comprising selecting the plurality of frequency layers for the user equipment to measure from a set of available frequency layers.

5. The method as claimed in claim 4, wherein the plurality of frequency layers are selected based on at least one of:

a capability of the user equipment;

the respective priority levels of the plurality of frequency layers;

respective capabilities of the plurality of frequency layers;

a capability of the user equipment to use the frequency layer;

a capability of the frequency layer to support Evolved Universal Mobile Telecommunications System Terrestrial Radio Access Network New Radio Dual Connectivity (ENDC);

a capability of the frequency layer to support New Radio Dual Connectivity (NRDC); and a capability of the frequency layer to support New Radio Carrier Aggregation (NRCA).

6. The method as claimed in claim 1, wherein the time period is started after the first measurement report is received.

7. The method as claimed in claim 1, wherein the step of determining whether to perform a handover comprises:

determining to perform a handover of the user equipment to the frequency layer having the highest priority for which a measurement report has been received.

8. The method as claimed in claim 1, further comprising:

if it is determined that a handover should be performed, initiating the handover.

9. The method as claimed in claim 1, wherein the handover is an E-UTRAN New Radio Dual Connectivity-triggered handover to a Long-Term Evolution (LTE) anchor layer.

10. The method as claimed in claim 9, wherein determining whether to perform a handover is further based on whether the frequency layers for which measurement reports have been received support E-UTRAN NR Dual Connectivity (ENDC).

11. The method as claimed in claim 1, wherein the handover is a Long-Term Evolution (LTE) inter-frequency handover or a New Radio (NR) inter-frequency handover.

12. The method as claimed in claim 1, wherein the handover is to one of:

a frequency layer to enable carrier aggregation to be used by the user equipment;

a frequency layer to enable New Radio Dual Connectivity (NRDC) to be used by the user equipment; or a frequency layer to enable New Radio Carrier Aggregation (NRCA) to be used by the user equipment.

13. The method as claimed in claim 1, wherein the user equipment is capable of one or more of: E-UTRAN New Radio Dual Connectivity (ENDC), New Radio Dual Connectivity (NRDC), and New Radio Carrier Aggregation (NRCA).

14. The method as claimed in claim 13, wherein, prior to a handover, the user equipment is connected to a frequency layer that does not support ENDC, NRDC and/or NRCA.

15. The method as claimed in claim 1, wherein the priority level of the frequency layers is an EndcHoFreqPriority.

16. A radio access network (RAN) node configured to:

receive, from a user equipment, a first measurement report relating to a first frequency layer;

determine whether a priority level of the first frequency layer is lower than a priority level of another frequency layer to be measured by the user equipment;

if the priority level of the first frequency layer is lower than a priority level of another frequency layer to be measured by the user equipment, wait, for up to a predetermined time period, to receive a second measurement report relating to a frequency layer of a higher priority level than the first frequency layer; and determine whether to perform a handover of the user equipment based on the one or more received measurement reports.

17. The RAN node as claimed in claim 16, further configured to:

prior to receiving the first measurement report, send, to the user equipment, a request to measure a plurality of frequency layers.

18. The RAN node as claimed in claim 17, wherein each of the plurality of frequency layers has a respective priority level.

19. The RAN node as claimed in claim 17, further configured to:

select the plurality of frequency layers for the user equipment to measure from a set of available frequency layers.

20. A radio access network (RAN) node comprising a processor and a memory, the memory containing instructions executable by the processor, whereby the RAN node is operative to:

receive, from a user equipment, a first measurement report relating to a first frequency layer;

determine whether a priority level of the first frequency layer is lower than a priority level of another frequency layer to be measured by the user equipment;

if the priority level of the first frequency layer is lower than a priority level of another frequency layer to be measured by the user equipment, wait, for up to a predetermined time period, to receive a second measurement report relating to a frequency layer of a higher priority level than the first frequency layer; and determine whether to perform a handover of the user equipment based on the one or more received measurement reports.

* * * * *